(12) United States Patent
Mitsutani

(10) Patent No.: US 8,058,848 B2
(45) Date of Patent: Nov. 15, 2011

(54) VEHICLE CHARGING SYSTEM

(75) Inventor: Noritake Mitsutani, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 280 days.

(21) Appl. No.: 12/577,763

(22) Filed: Oct. 13, 2009

(65) Prior Publication Data

US 2010/0127665 A1 May 27, 2010

(30) Foreign Application Priority Data

Nov. 26, 2008 (JP) ................................ 2008-301180

(51) Int. Cl.
  *H02J 7/04* (2006.01)
  *H02J 7/14* (2006.01)
(52) U.S. Cl. ........................................ 320/137; 320/104
(58) Field of Classification Search .................. 320/137
  See application file for complete search history.

(56) References Cited

U.S. PATENT DOCUMENTS

| 5,724,809 | A * | 3/1998 | Mitsutani et al. | 60/276 |
| 6,495,989 | B1 * | 12/2002 | Eguchi | 320/132 |
| 2003/0117112 | A1 * | 6/2003 | Chen et al. | 320/137 |

FOREIGN PATENT DOCUMENTS

| JP | 05207668 A | 8/1993 |
| JP | 06253461 A | 9/1994 |
| JP | 2005102453 A | 4/2005 |
| JP | 2008109840 A | 5/2008 |
| JP | 2008220130 A | 9/2008 |

* cited by examiner

*Primary Examiner* — M'Baye Diao
(74) *Attorney, Agent, or Firm* — Gifford, Krass, Sprinkle, Anderson & Citkowski, P.C.

(57) ABSTRACT

A charger is operable in a normal mode such that output power matches a provided electric power command value CHPW, and limits the output power to a limit value PS in a saving mode if the electric power command value CHPW exceeds the limit value PS. A charging ECU performs feedback-control for compensating for the electric power command value CHPW such that a charging power monitor value PM sensed by a charging power sensing unit matches a target value PR, and in addition, limits an increase in the electric power command value CHPW such that the electric power command value CHPW does not significantly deviate from the target value PR. As a result, in a vehicle charging system on which an add-on charger having a power saving function is mounted, stabilization of the behavior when the add-on charger returns from a saving operation to a normal operation is allowed.

6 Claims, 12 Drawing Sheets

VEHICLE CHARGING SYSTEM

This nonprovisional application is based on Japanese Patent Application No. 2008-301180 filed on Nov. 26, 2008 with the Japan Patent Office, the entire contents of which are hereby incorporated by reference.

BACKGROUND OF THE INVENTION

1. Field of the Invention

The present invention relates to a vehicle charging system, and in particular, to a vehicle charging system including a charger configured to be supplied with electric power from a power supply external to a vehicle for charging a vehicle-mounted power storage device.

2. Description of the Background Art

In an electric vehicle and a hybrid vehicle, it is under consideration to mount a plurality of power storage devices thereon to extend the distance that can be traveled without operating an engine (EV travel distance). When the plurality of power storage devices are mounted in this manner, electric power distribution to each power storage device is a problem.

Japanese Patent Laying-Open No. 2008-109840 discloses a power supply system for a vehicle on which a plurality of power storage devices are mounted. In this power supply system, a discharge share ratio calculation unit determines, for each of the plurality of power storage devices, a remaining electric power quantity before a state of charge (SOC) is reached with respect to which an allowable discharge electric power is restricted, and determines a discharge power share ratio according to a ratio of the remaining electric power quantity between the plurality of power storage devices.

A charge share ratio calculation unit determines, for each of the plurality of power storage devices, a chargeable quantity before SOC is reached with respect to which an allowable charge electric power is restricted, and determines a charge power share ratio according to a ratio of the chargeable quantity between the plurality of power storage devices. When electric power is supplied from the power supply system to a drive force generation unit, a plurality of converters are controlled according to the discharge power share ratio. When electric power is supplied from the drive force generation unit to the power supply system, the plurality of converters are controlled according to the charge power share ratio.

In recent years, in the hybrid vehicle, it is under consideration to configure a mounted power storage device to be externally chargeable as well. Such a vehicle will also be referred to as a plug-in vehicle hereinafter.

In order to implement the plug-in vehicle, it is desirable to increase the capacity of the power storage device and increase the amount of electric power that can be externally charged. In addition to the power supply system (the system for power running during operation of the vehicle and charge/discharge during regeneration) as disclosed in Japanese Patent Laying-Open No. 2008-109840, it is easy to mount a charger when the vehicle is externally charged. Such an additional charger is also referred to as an add-on charger.

Generally, a charger for a power storage device such as a battery often has a power saving function of anticipating that the charger may overheat and limiting charging power so as to prevent the overheating caused by an excessive current flowing through the charger. When the add-on charger whose charging power is limited by the power saving function returns to a normal state, however, care must be taken to prevent excessive electric power flowing through the add-on charger or an unstable state of the charging power caused by hunting and the like. Japanese Patent Laying-Open No. 2008-109840 described above does not disclose such a problem.

SUMMARY OF THE INVENTION

An object of the present invention is to provide a vehicle charging system on which an add-on charger having a power saving function is mounted, which allows stabilization of the behavior when the add-on charger returns from a saving operation to a normal operation.

In summary, the present invention is directed to a vehicle charging system for charging a vehicle-mounted power storage device, including: a charger configured to be supplied with electric power from a power supply external to a vehicle for charging the power storage device, and operable in a normal mode such that output power matches a provided electric power command value, and limiting the output power to a limit value in a saving mode if the electric power command value exceeds the limit value; a charging power sensing unit for sensing charging power supplied to the power storage device; and a charging control device for generating the electric power command value and outputting the electric power command value to the charger. The charging control device performs feedback-control for compensating for the electric power command value based on the charging power sensed by the charging power sensing unit, such that the charging power sensed by the charging power sensing unit matches a target value, and in addition, limits an increase in the electric power command value such that the electric power command value does not significantly deviate from the target value.

Preferably, if the charging control device detects that the charging power sensed by the charging power sensing unit changes from around the target value to around the limit value within a prescribed time period, the charging control device limits the electric power command value to prevent the electric power command value from increasing while the charging power sensed by the charging power sensing unit remains at around the limit value.

Preferably, the charger includes a sensor for detecting whether or not a saving operation condition that designates the possibility of overheating of the charger is satisfied, a control unit for determining switching of an operation mode between the saving mode and the normal mode, based on an output of the sensor, and an electric power limiting unit for limiting the electric power from the power supply and supplying the electric power to the power storage device as the charging power under control of the control unit. The charging control device determines that the operation mode of the charger is shifted from the normal mode to the saving mode if the charging control device detects that the charging power sensed by the charging power sensing unit changes from around the target value to around the limit value within a prescribed time period, and recognizes that the operation mode returns from the saving mode to the normal mode when the charging power sensed by the charging power sensing unit starts to increase from around the limit value toward around the target value afterward.

More preferably, in the saving mode, the control unit uses the limit value as an internal electric power command value to cause the electric power limiting unit to limit the charging power if the electric power command value is larger than the limit value, and at the time of return from the saving mode to the normal mode, the control unit limits a degree of an increase in the internal electric power command value when the internal electric power command value is matched with the electric power command value.

Preferably, if the charging control device detects that the charging power sensed by the charging power sensing unit remains at around the limit value and a state in which the electric power command value is apart from the charging power sensed by the charging power sensing unit by a first threshold value or more continues for a first time period, the charging control device determines that an operation mode of the charger is the saving mode. If the charging control device detects that the charging power sensed by the charging power sensing unit does not remain at around the limit value and a state in which the electric power command value is apart from the target value by a second threshold value or more continues for a second time period, the charging control device determines that the charger fails.

More preferably, the charging control device returns the electric power command value to around the target value if the charging control device determines that the operation mode of the charger is the saving mode, and sets the electric power command value to zero and stops charging if the charging control device determines that the charger fails.

According to the present invention, the excessive charging power flowing through the add-on charger or the unstable behavior when the add-on charger returns from the power saving operation to the normal operation can be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
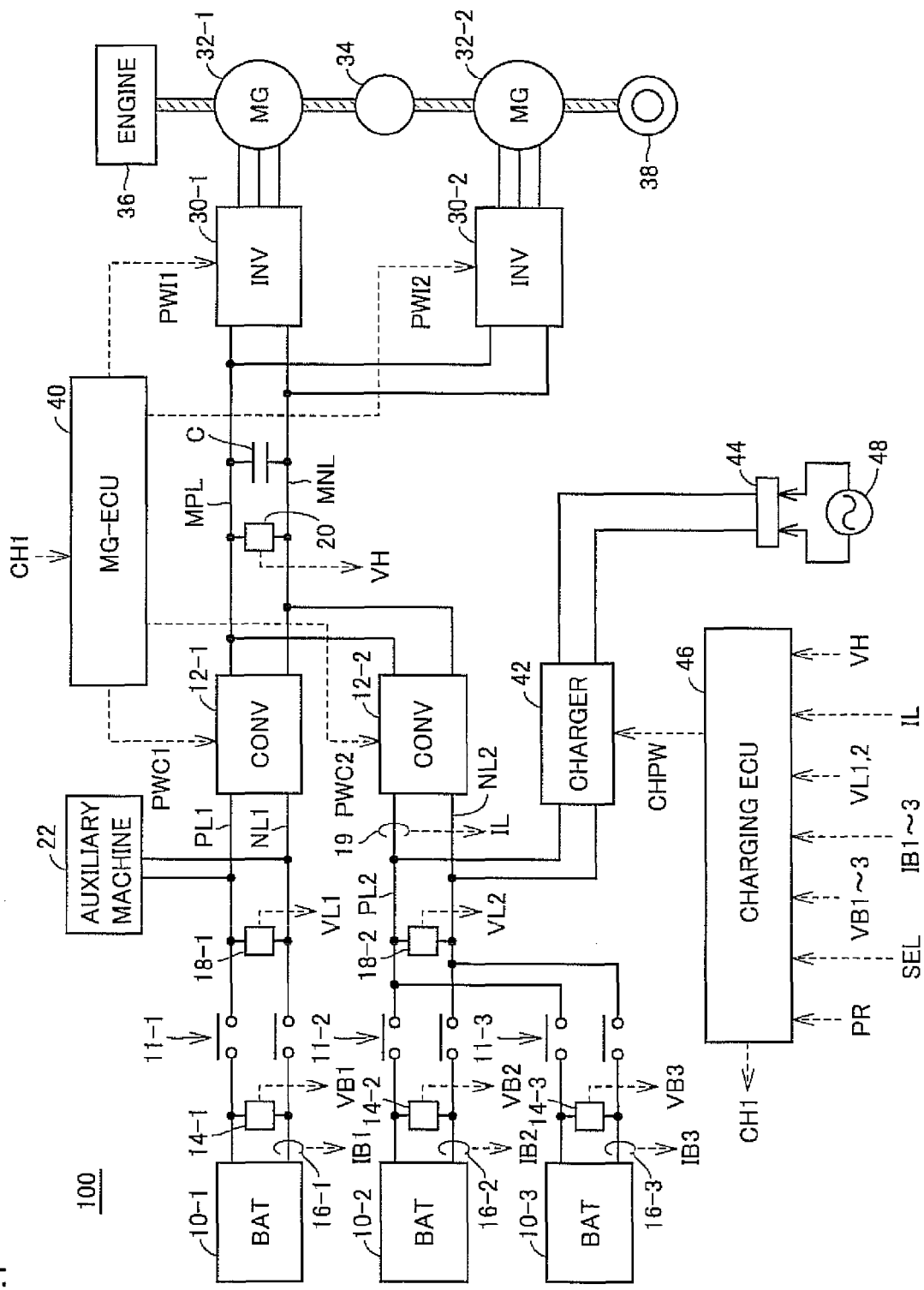
FIG. 1 is an overall block diagram of a hybrid vehicle shown as an example of an electric vehicle according to the present invention.

Embodiments of the present invention will be hereinafter described in detail with reference to the drawings, wherein the same or corresponding portions are represented by the same reference characters, and description thereof will not be repeated.

[Overall Configuration of Vehicle]

FIG. 1 is an overall block diagram of a hybrid vehicle shown as an example of an electric vehicle according to the present invention.

Referring to FIG. 1, a hybrid vehicle 100 includes power storage devices 10-1 to 10-3, system main relays 11-1 to 11-3, converters 12-1, 12-2, a main positive bus MPL, a main negative bus MNL, a smoothing capacitor C, and an auxiliary machine 22. Hybrid vehicle 100 further includes inverters 30-1, 30-2, motor generators 32-1, 32-2, a power split device 34, an engine 36, and a drive wheel 38. Hybrid vehicle 100 further includes voltage sensors 14-1 to 14-3, 18-1, 18-2, 20, current sensors 16-1 to 16-3, 19, and an MG-ECU (Electronic Control Unit) 40. Hybrid vehicle 100 further includes a charger 42, a vehicle inlet 44 and a charging ECU 46.

Each of power storage devices 10-1 to 10-3 is a rechargeable direct current (DC) power supply, and includes a secondary battery such as nickel hydride and lithium ion, a large-capacitance capacitor and the like. Power storage device 10-1 is connected to converter 12-1 with system main relay 11-1 interposed therebetween. Power storage devices 10-2 and 10-3 are connected to converter 12-2 with system main relays 11-2 and 11-3 interposed therebetween, respectively.

System main relay 11-1 is provided between power storage device 10-1 and converter 12-1. System main relay 11-2 is provided between power storage device 10-2 and converter 12-2, and system main relay 11-3 is provided between power storage device 10-3 and converter 12-2. It is noted that system main relays 11-2 and 11-3 are selectively turned on and are never turned on at the same time in order to avoid a short circuit in power storage device 10-2 and power storage device 10-3.

Converters 12-1 and 12-2 are connected in parallel and are connected to main positive bus MPL and main negative bus MNL. Converter 12-1 carries out voltage conversion between power storage device 10-1 and main positive bus MPL and main negative bus MNL, based on a signal PWC1 from MG-ECU 40. Converter 12-2 carries out voltage conversion between any one of power storage device 10-2 and power storage device 10-3 electrically connected to converter 12-2 and main positive bus MPL and main negative bus MNL, based on a signal PWC2 from MG-ECU 40.

Auxiliary machine 22 is connected to a positive electrode line PL1 and a negative electrode line NL1 placed between system main relay 11-1 and converter 12-1. Smoothing capacitor C is connected between main positive bus MPL and main negative bus MNL, and reduces an electric power fluctuation component included in main positive bus MPL and main negative bus MNL.

Inverters 30-1 and 30-2 are connected in parallel and are connected to main positive bus MPL and main negative bus MNL. Inverter 30-1 drives motor generator 32-1 based on a signal PWI1 from MG-ECU 40. Inverter 30-2 drives motor generator 32-2 based on a signal PWI2 from MG-ECU 40.

Motor generators 32-1 and 32-2 are alternating current (AC) rotating electric machines, and are permanent magnet type synchronous motors including a rotor in which a permanent magnet is embedded, for example. Motor generators 32-1 and 32-2 are coupled to power split device 34. Power split device 34 includes a planetary gear including a sun gear, a pinion gear, a carrier, and a ring gear. The pinion gear engages the sun gear and the ring gear. The carrier rotatably supports the pinion gear, and in addition, is coupled to a crankshaft of engine 36. The sun gear is coupled to a rotation shaft of motor generator 32-1. The ring gear is coupled to a rotation shaft of motor generator 32-2 and drive wheel 38. Motive power generated by engine 36 is divided by this power split device 34 into a path through which the motive power is transmitted to drive wheel 38 and a path through which the motive power is transmitted to motor generator 32-1.

Motor generator 32-1 generates electric power by using the motive power of engine 36 divided by power split device 34. For example, when SOC of power storage devices 10-1 to 10-3 is decreased, engine 36 starts and motor generator 32-1 generates electric power. The generated electric power is supplied to the power storage devices.

On the other hand, motor generator 32-2 generates driving force by using at least one of the electric power supplied from at least one of power storage devices 10-1 to 10-3 and the electric power generated by motor generator 32-1. The driving force of motor generator 32-2 is transmitted to drive wheel 38. It is noted that, during braking of the vehicle, the kinetic energy of the vehicle is transmitted from drive wheel 38 to motor generator 32-2 to drive motor generator 32-2, and motor generator 32-2 operates as a generator. Thus, motor generator 32-2 operates as a regenerative brake for converting the kinetic energy of the vehicle to electric power and recovering the electric power.

MG-ECU 40 generates signals PWC1 and PWC2 for driving converters 12-1 and 12-2, respectively, and outputs generated signals PWC1 and PWC2 to converters 12-1 and 12-2, respectively. Furthermore, MG-ECU 40 generates signals PWI1 and PWI2 for driving motor generators 32-1 and 32-2, respectively, and outputs generated signals PWI1 and PWI2 to inverters 30-1 and 30-2, respectively.

At the time of charging of power storage device 10-1 by charger 42, when a signal CH1 received from charging ECU 46 is rendered active, MG-ECU 40 generates signals PWC1 and PWC2 and outputs generated signals PWC1 and PWC2 to converters 12-1 and 12-2, respectively, such that charging power is supplied sequentially from charger 42 through converter 12-2, main positive bus MPL and main negative bus MNL, and converter 12-1 to power storage device 10-1.

Charger 42 has an input end connected to vehicle inlet 44, and an output end connected to a positive electrode line PL2 and a negative electrode line NL2 placed between system main relays 11-2, 11-3 and converter 12-2. Charger 42 receives, from vehicle inlet 44, electric power supplied from power supply 48 external to the vehicle (that will also be referred to as "external power supply" hereinafter). Charger 42 receives an electric power command value CHPW from charging ECU 46, and an output voltage of charger 42 is controlled to a prescribed DC voltage, and in addition, output power of charger 42 is controlled to match electric power indicated by electric power command value CHPW. Vehicle inlet 44 is an electric power interface for receiving the electric power from external power supply 48.

Voltage sensors 14-1 to 14-3 detect a voltage VB1 of power storage device 10-1, a voltage VB2 of power storage device 10-2 and a voltage VB3 of power storage device 10-3, respectively, and output the detected values to charging ECU 46. Current sensors 16-1 to 16-3 detect a current IB1 input/output from/to power storage device 10-1, a current IB2 input/output from/to power storage device 10-2, and a current IB3 input/output from/to power storage device 10-3, respectively, and output the detected values to charging ECU 46.

Voltage sensors 18-1 and 18-2 detect a voltage VL1 between positive electrode line PL1 and negative electrode line NL1 as well as a voltage VL2 between positive electrode line PL2 and negative electrode line NL2, respectively, and output the detected values to charging ECU 46. Current sensor 19 detects a current IL of positive electrode line PL2 input/output from/to converter 12-2, and outputs the detected value to charging ECU 46. It is noted that, when power storage device 10-1 is charged by charger 42, this current sensor 19 can detect a current flowing from charger 42 to converter 12-2. Voltage sensor 20 detects a voltage VH between main positive bus MPL and main negative bus MNL, and outputs the detected value to charging ECU 46.

During charging of power storage devices 10-1 to 10-3 by external power supply 48 connected to vehicle inlet 44, charging ECU 46 receives a target value PR of the charging power (kW/h) for power storage devices 10-1 to 10-3 from a not-shown vehicle ECU. Furthermore, charging ECU 46 receives, from the above vehicle ECU, a signal SEL indicating which one of power storage devices 10-1 to 10-3 is charged by charger 42. In other words, in the present first embodiment, power storage devices 10-1 to 10-3 are sequentially charged in a predetermined order.

It is noted that, when power storage device 10-1 is charged, signal CH1 is output from charging ECU 46 to MG-ECU 40, and converters 12-1 and 12-2 are operated to cause the electric power to flow sequentially from charger 42 through converter 12-2 and converter 12-1 to power storage device 10-1. Here, during charging of power storage device 10-1, auxiliary machine 22 connected between power storage device 10-1 and converter 12-1 is operated by using the electric power supplied from charger 42. On the other hand, during charging of power storage device 10-2 or power storage device 10-3, auxiliary machine 22 is supplied with electric power from power storage device 10-1.

During charging of power storage devices 10-1 to 10-3 by external power supply 48, charging ECU 46 generates electric power command value CHPW indicating a target value of the output power of charger 42, and outputs generated electric power command value CHPW to charger 42.

At this time, charging ECU 46 receives each of the detected values of voltages VB1 to VB3, VL1, VL2, and VH as well as currents IB1 to IB3 and IL, and makes a feedback correction to electric power command value CHPW of charger 42, based on each of the above detected values, such that the charging power actually supplied to power storage devices 10-1 to 10-3 matches electric power indicated by target value PR. In other words, in the present embodiment, not only is charger 42 controlled such that the output power of charger 42 matches the electric power indicated by the target value, but also the feedback correction is made to electric power command value CHPW based on the state of the power storage devices such that the actual charging power for the power storage devices matches the electric power indicated by the target value. As a result, the charging power for power storage devices 10-1 to 10-3 can be reliably matched with the electric power indicated by target value PR.

Figure 2:
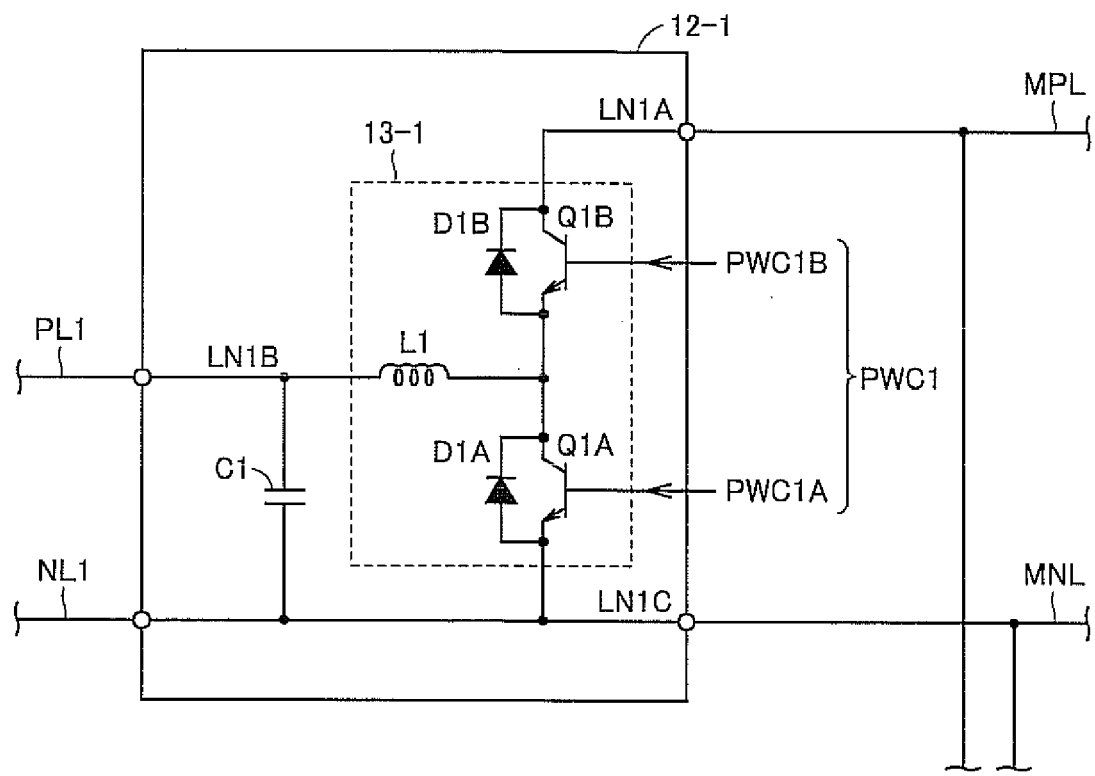
FIG. 2 is a schematic configuration diagram of converters 12-1 and 12-2 shown in FIG. 1.

FIG. 2 is a schematic configuration diagram of converters 12-1 and 12-2 shown in FIG. 1. It is noted that each converter has a similar configuration and operation, and therefore, the configuration and operation of converter 12-1 will be hereinafter described as a representative example.

Referring to FIG. 2, converter 12-1 includes a chopper circuit 13-1, a positive bus LN1A, a negative bus LN1C, a wiring LN1B, and a smoothing capacitor C1. Chopper circuit 13-1 includes switching elements Q1A, Q1B, diodes D1A, D1B, and an inductor L1.

Positive bus LN1A has one end connected to a collector of switching element Q1B, and the other end connected to main positive bus MPL. Negative bus LN1C has one end connected to negative electrode line NL1, and the other end connected to main negative bus MNL.

Switching elements Q1A and Q1B are connected in series between negative bus LN1C and positive bus LN1A. Specifically, switching element Q1A has an emitter connected to negative bus LN1C, and switching element Q1B has the collector connected to positive bus LN1A. Diodes D1A and D1B are connected in antiparallel to switching elements Q1A and Q1B, respectively. Inductor L1 is connected between a connection node of switching elements Q1A, Q1B and wiring LN1B.

Wiring LN1B has one end connected to positive electrode line PL1, and the other end connected to inductor L1. Smoothing capacitor C1 is connected between wiring LN1B and negative bus LN1C, and reduces an AC component included in a DC voltage between wiring LN1B and negative bus LN1C.

Chopper circuit 13-1 carries out bidirectional conversion of a DC voltage between power storage device 10-1 (FIG. 1) and main positive bus MPL and main negative bus MNL, in response to signal PWC1 from MG-ECU 40 (FIG. 1). Signal PWC1 includes a signal PWC1A for controlling on/off of switching element Q1A that forms a lower arm element, and a signal PWC1B for controlling on/off of switching element Q1B that forms an upper arm element. A duty ratio (a ratio between the on period and the off period) of switching elements Q1A and Q1B within a fixed duty cycle (a sum of the on period and the off period) is controlled by MG-ECU 40.

When switching elements Q1A and Q1B are controlled such that the on duty of switching element Q1A is increased (the on duty of switching element Q1B is decreased because on/off of switching elements Q1A and Q1B is complementarily controlled except the dead time period), the amount of pump current flowing from power storage device 10-1 to inductor L1 is increased, and electromagnetic energy stored in inductor L1 is increased. Consequently, the amount of current discharged from inductor L1 through diode D1B to main positive bus MPL when switching element Q1A is switched from the on state to the off state is increased, and therefore, the voltage of main positive bus MPL is raised.

On the other hand, when switching elements Q1A and Q1B are controlled such that the on duty of switching element Q1B is increased (the on duty of switching element Q1A is decreased), the amount of current flowing from main positive bus MPL through switching element Q1B and inductor L1 to power storage device 10-1 is increased, and therefore, the voltage of main positive bus MPL is lowered.

As described above, by controlling the duty ratio of switching elements Q1A and Q1B, the voltage of main positive bus MPL can be controlled, and in addition, the direction of the current (electric power) flowing between power storage device 10-1 and main positive bus MPL as well as the amount of current (the amount of electric power) can be controlled.

Figure 3:
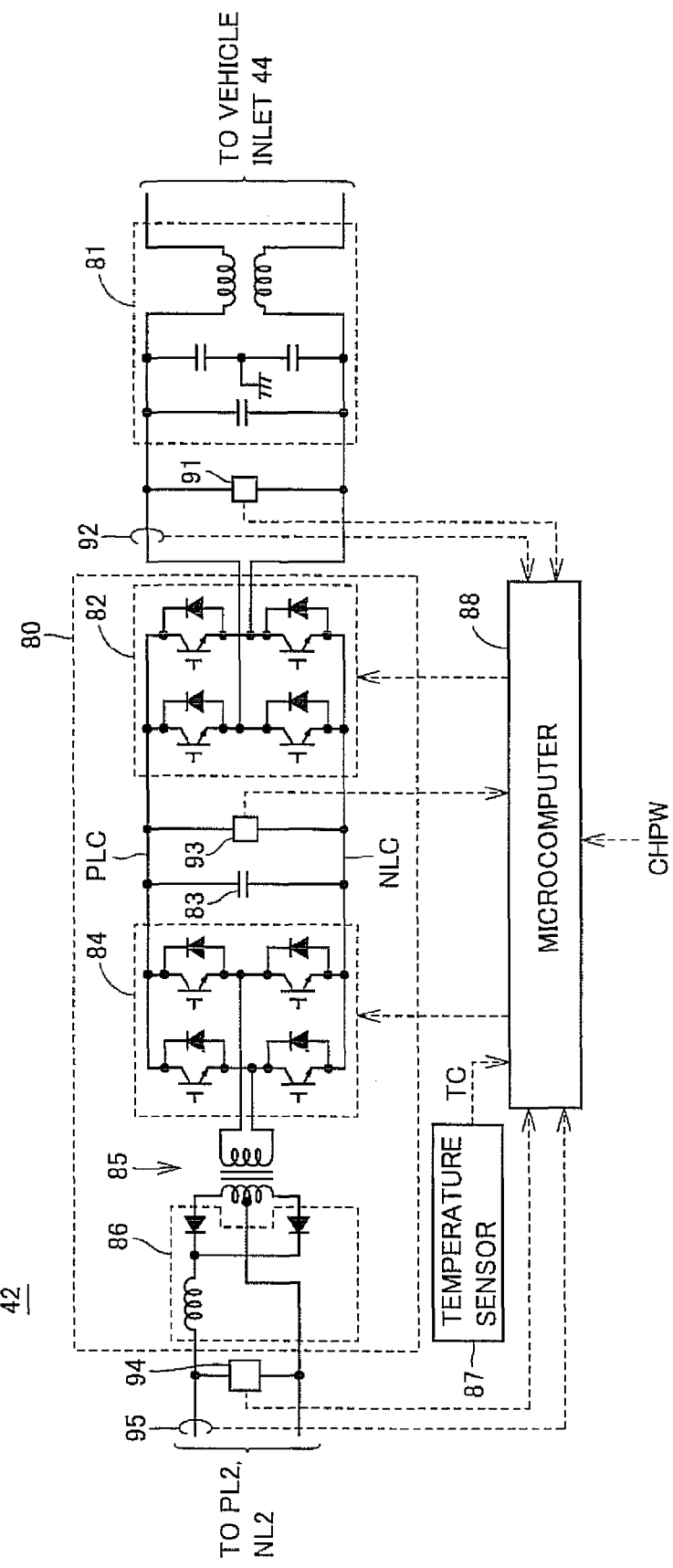
FIG. 3 is a schematic configuration diagram of a charger 42 shown in FIG. 1.

FIG. 3 is a schematic configuration diagram of charger 42 shown in FIG. 1.

Referring to FIG. 3, charger 42 includes a filter 81, an electric power limiting unit 80, a temperature sensor 87, voltage sensors 91, 93, 94, current sensors 92, 95, and a microcomputer 88.

Electric power limiting unit 80 includes an AC/DC converting unit 82, a smoothing capacitor 83, a DC/AC converting unit 84, an isolating transformer 85, and a rectifying unit 86.

Filter 81 is provided between vehicle inlet 44 (FIG. 1) and AC/DC converting unit 82, and prevents a high-frequency noise from being output from vehicle inlet 44 to external power supply 48 during charging of power storage devices 10-1 to 10-3 by external power supply 48 (FIG. 1). AC/DC converting unit 82 includes a single-phase bridge circuit. AC/DC converting unit 82 converts AC electric power supplied from external power supply 48 to DC electric power and outputs the converted DC electric power to a positive electrode line PLC and a negative electrode line NLC, based on a drive signal from microcomputer 88. Smoothing capacitor 83 is connected between positive electrode line PLC and negative electrode line NLC, and reduces an electric power fluctuation component included in between positive electrode line PLC and negative electrode line NLC.

DC/AC converting unit 84 includes a single-phase bridge circuit. DC/AC converting unit 84 converts the DC electric power supplied from positive electrode line PLC and negative electrode line NLC to high-frequency AC electric power and outputs the converted AC electric power to isolating transformer 85, based on a drive signal from microcomputer 88. Isolating transformer 85 includes a core having a magnetic material as well as a primary coil and a secondary coil wound around the core. The primary coil and the secondary coil are electrically insulated from each other and connected to DC/AC converting unit 84 and rectifying unit 86, respectively. Isolating transformer 85 converts the high-frequency AC electric power received from DC/AC converting unit 84 to a voltage level in accordance with winding ratios of the primary coil and the secondary coil, and outputs the AC electric power to rectifying unit 86. Rectifying unit 86 rectifies the AC electric power output from isolating transformer 85 to DC electric power, and outputs the rectified DC electric power to positive electrode line PL2 and negative electrode line NL2.

Voltage sensor 91 detects a voltage of external power supply 48 filtered by filter 81, and outputs the detected value to microcomputer 88. Current sensor 92 detects a current supplied from external power supply 48, and outputs the detected value to microcomputer 88. Voltage sensor 93 detects a voltage between positive electrode line PLC and negative electrode line NLC, and outputs the detected value to microcomputer 88. Voltage sensor 94 detects a voltage on the output side of rectifying unit 86, and outputs the detected value to microcomputer 88. Current sensor 95 detects a current output from rectifying unit 86, and outputs the detected value to microcomputer 88.

Microcomputer 88 generates drive signals for driving AC/DC converting unit 82 and DC/AC converting unit 84, based on each of the detected values of voltage sensors 91, 93, 94 and current sensors 92, 95, such that the output power of charger 42 calculated based on the detected values of voltage sensor 94 and current sensor 95 matches the electric power indicated by electric power command value CHPW. Then, microcomputer 88 outputs the generated drive signals to AC/DC converting unit 82 and DC/AC converting unit 84.

Temperature sensor 87 detects whether or not a saving operation condition that designates the possibility of overheating of charger 42 is satisfied. Specifically, temperature sensor 87 detects a temperature TC of charger 42 and sends temperature TC to microcomputer 88. Microcomputer 88 switches the operation mode of charger 42 between the saving mode and the normal mode, based on temperature TC output by temperature sensor 87. Electric power limiting unit 80 limits the electric power from the power supply external to the vehicle and supplies the limited electric power as the charging power for power storage devices 10-1 to 10-3 under the control of microcomputer 88.

Figure 4:
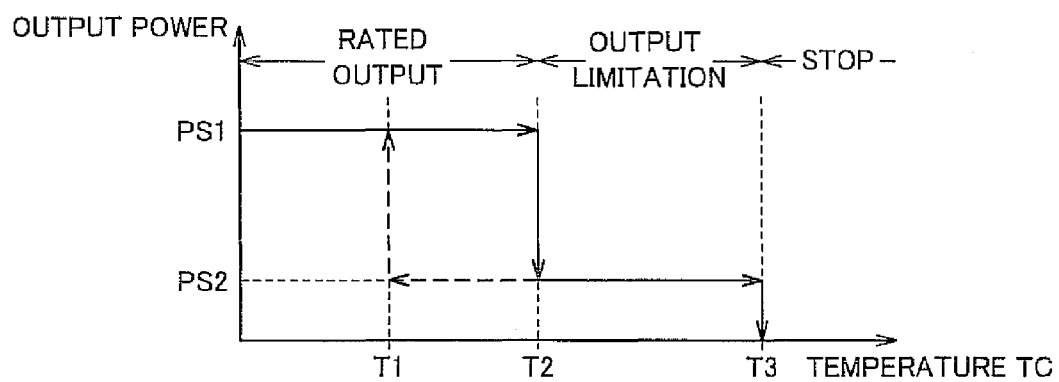
FIG. 4 shows a change in a limit value of charging power determined by a microcomputer 88 in FIG. 3.

FIG. 4 shows a change in a limit value of the charging power determined by microcomputer 88 in FIG. 3.

In FIG. 4, the vertical axis indicates the output power from charger 42, that is, the charging power. The horizontal axis indicates temperature TC detected by temperature sensor 87. From the low temperature state to a threshold temperature T2, microcomputer 88 sets a rated output PS1 as an output limit value of charger 42. The operation mode in this case is the normal mode. When temperature TC exceeds threshold temperature T2, the operation mode is shifted to the saving mode, which causes electric power limiting unit 80 to perform the output limiting operation. In this case, the output limit value decreases from PS1 to PS2.

While temperature TC is between threshold temperature T2 and a threshold temperature T3, charger 42 is operated in the saving mode. When temperature TC exceeds threshold temperature T3, microcomputer 88 stops the operation of electric power limiting unit 80 and stops charging.

On the other hand, when temperature TC is decreased below threshold temperature T3 due to the stop of charging, the charger is operated in the saving mode again, and the saving mode is maintained until temperature TC is decreased to threshold temperature T1. When temperature TC is further decreased below threshold temperature T1, the operation mode of charger 42 returns to the normal mode.

Figure 5:
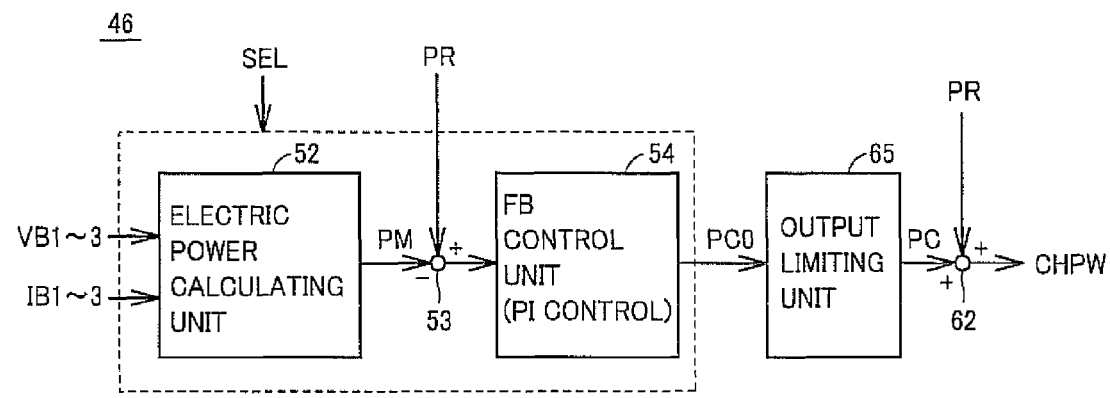
FIG. 5 is a functional block diagram of a charging ECU 46 shown in FIG. 1.

FIG. 5 is a functional block diagram of charging ECU 46 shown in FIG. 1.

Referring to FIG. 5, charging ECU 46 includes an electric power calculating unit 52, a subtracting unit 53, a feedback (FB) control unit 54, an output limiting unit 65, and an adding unit 62.

When power storage device 10-1 is charged by charger 42, electric power calculating unit 52 calculates the charging power for power storage device 10-1 based on the detected values of voltage VB1 and current IB1, and outputs the result of the operation to subtracting unit 53 as a monitor value PM. It is noted that charging of power storage device 10-1 by charger 42 is determined based on signal SEL received from the not-shown vehicle ECU. Furthermore, when power storage device 10-2 is charged by charger 42, electric power calculating unit 52 calculates the charging power for power storage device 10-2 based on the detected values of voltage VB2 and current IB2, and outputs the result of the operation to subtracting unit 53 as monitor value PM. Furthermore, when power storage device 10-3 is charged by charger 42, electric power calculating unit 52 calculates the charging power for power storage device 10-3 based on the detected values of voltage VB3 and current IB3, and outputs the result of the operation to subtracting unit 53 as monitor value PM.

Subtracting unit 53 subtracts monitor value PM calculated by electric power calculating unit 52 from target value PR of the charging power (kW/h) for power storage devices 10-1 to 10-3 received from the not-shown vehicle ECU described above, and outputs the result of the operation to feedback control unit 54. It is noted that target value PR may be different or the same for each of power storage devices 10-1 to 10-3.

Feedback control unit 54 uses, as a control input, a deviation between target value PR of the charging power (kW/h) received from subtracting unit 53 and the monitor value to perform a proportional integral operation (PI control), and outputs the result of the operation to output limiting unit 65 as a feedback correction value PC0.

Output limiting unit 65 imposes a limitation such that electric power command value CHPW does not significantly deviate from target value PR. Output limiting unit 65 limits correction value before being limited PC0 output from feedback control unit 54 to a value that is not significantly apart from 0, and outputs a correction value PC. Adding unit 62 adds, to target value PR, correction value PC received from output limiting unit 65, and outputs the result of the operation as electric power command value CHPW.

In this charging ECU 46, the charging power (kW/h) for power storage devices 10-1 to 10-3 is feedback-controlled by feedback control unit 54 to match the electric power indicated by prescribed target value PR.

First Embodiment

A first embodiment is implemented by setting electric power command value CHPW output by charging ECU 46 in the configuration of the hybrid vehicle described above, based on a control method that will be described hereinafter.

Figure 6:
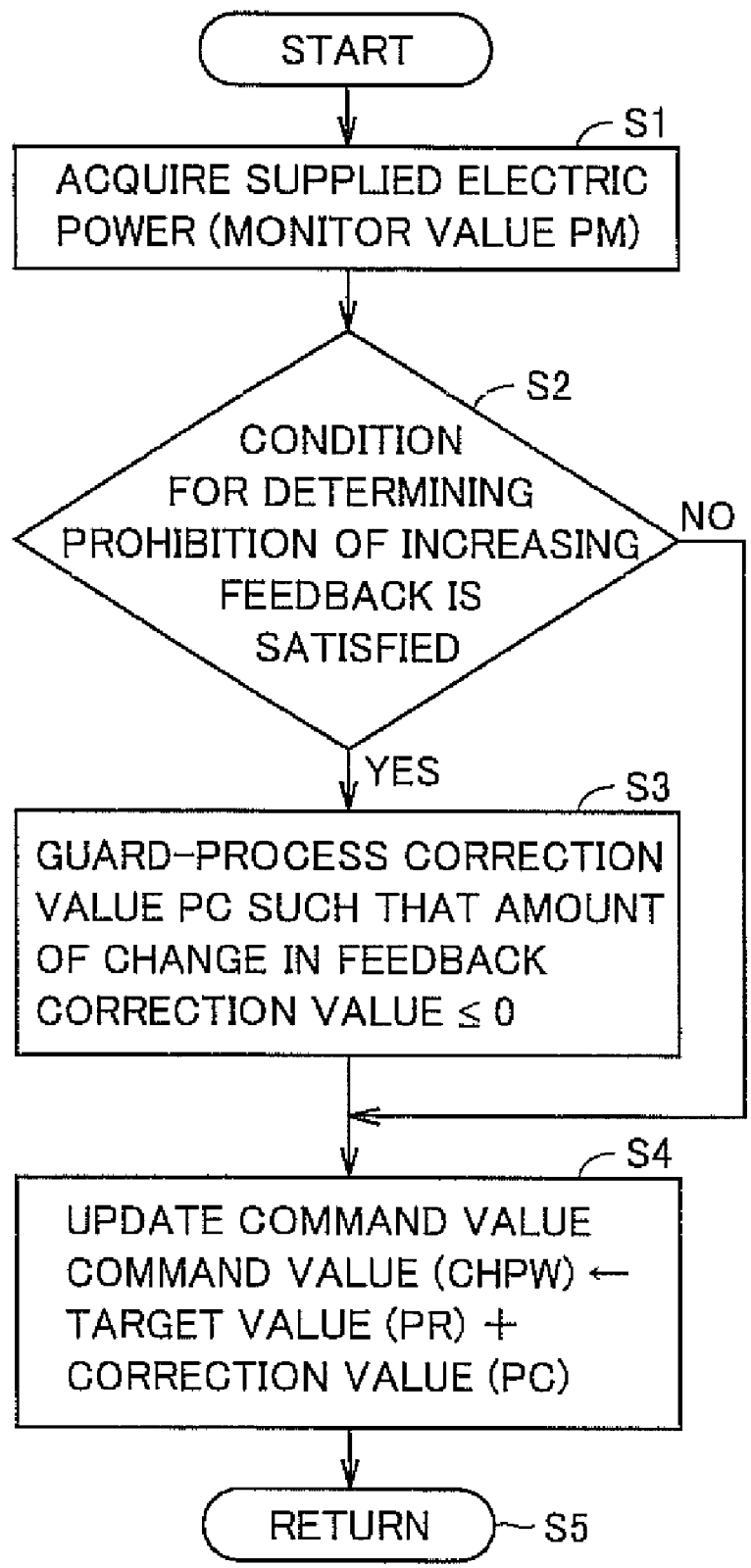
FIG. 6 is a flowchart for illustrating charging control by charging ECU 46 shown in FIG. 1.

FIG. 6 is a flowchart for illustrating charging control by charging ECU 46 shown in FIG. 1. The control shown in this flowchart is performed by a computer included in charging ECU 46. It is noted that the process in this flowchart is read for execution from a main routine at regular time intervals or whenever a prescribed condition is satisfied.

Referring to FIGS. 1 and 6, first, when this process starts, monitor value PM of the supplied electric power is acquired in step S1. This monitor value PM of the supplied electric power can be acquired by obtaining a product of output values of current sensors 16-1 to 16-3 and output values of voltage sensors 14-1 to 14-3 in FIG. 1 as well as a product of an output of current sensor 19 and an output of voltage sensor 18-2.

Subsequently, in step S2, it is determined whether or not a condition for determining prohibition of increasing feedback is satisfied.

This condition for determining prohibition of increasing feedback is satisfied corresponding to a case where charger 42 is being operated in the saving mode.

As previously described, however, charger 42 itself determines whether to be operated in the saving mode or in the normal mode, by using the built-in temperature sensor. An extra signal line is required to transmit the operation mode determined by charger 42 to charging ECU 46. Therefore, charging ECU 46 determines the operation mode of charger 42 based on target value PR and monitor value PM of the electric power.

Figure 7:
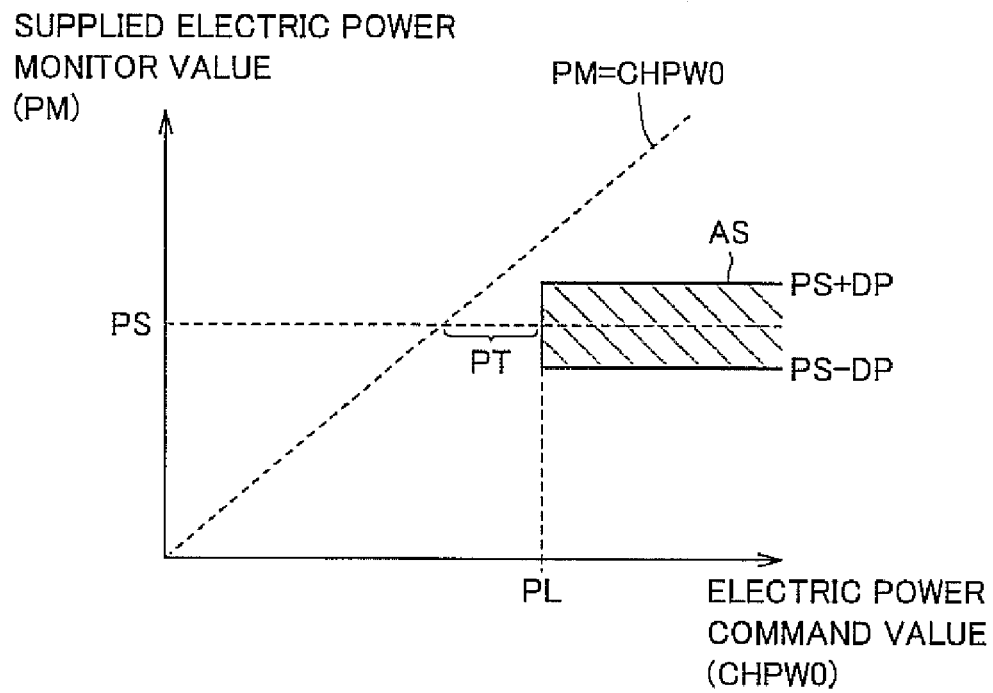
FIG. 7 illustrates a condition determined in step S2 in FIG. 6.

FIG. 7 illustrates the condition determined in step S2 in FIG. 6.

Referring to FIG. 7, the vertical axis indicates the supplied electric power monitor value (PM), and the horizontal axis indicates the electric power command value before being limited (CHPW0). If a coordinate indicated by a combination of supplied electric power monitor value PM and electric power command value CHPW0 is located within a region AS, charging ECU 46 determines that charger 42 is being operated in the saving mode.

It is noted that region AS is a region that has a width of ±DP with respect to a limit value PS at which charger 42 limits an output thereof in the saving mode, and a region where electric power command value CHPW0 is greater than or equal to a prescribed value PL. This prescribed value PL is larger than electric power monitor value PM by a threshold value PT or more. In such a state, monitor value PM is lower than the electric power target value, and therefore, electric power command value before being limited CHPW0 continues to increase. If electric power command value CHPW increases without limitation in this case, the charging power may become excessive temporarily when charger 42 returns from the saving mode.

Referring again to FIG. 6, if the condition for determining prohibition of increasing feedback is not satisfied in step S2, the process proceeds to step S4 without performing the process in step S3. On the other hand, if the condition for determining prohibition of increasing feedback is satisfied in step S2, correction value PC is guard-processed in step S3 such that the amount of change in the feedback correction value is less than or equal to 0. This process corresponds to a process performed by output limiting unit 65 in FIG. 5.

In step S4, the command value is updated. In step S4, a value obtained by adding correction value PC to target value PR is set as command value CHPW. This process corresponds to a process performed by adding unit 62 in FIG. 5.

Figure 8:
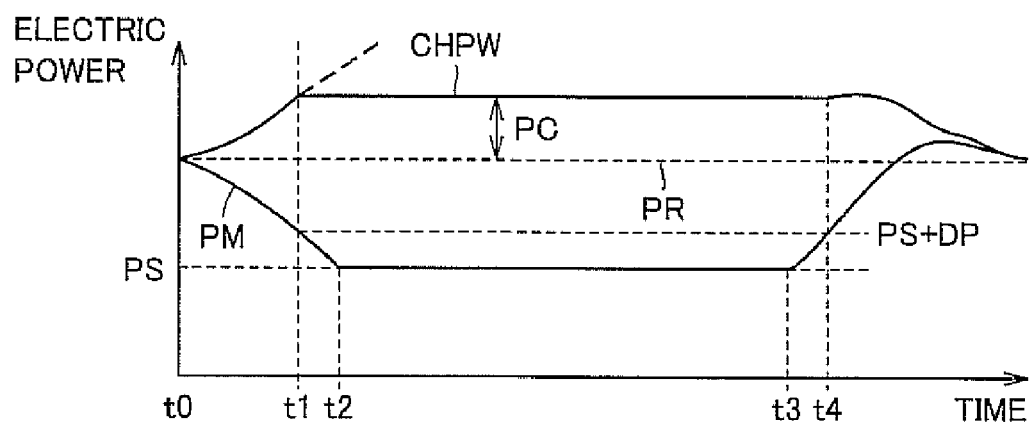
FIG. 8 is an operational waveform diagram for illustrating a state in which an electric power command value is output based on the flowchart in FIG. 6.

FIG. 8 is an operational waveform diagram for illustrating a state in which the electric power command value is output based on the flowchart in FIG. 6.

Referring to FIG. 8, the vertical axis indicates the electric power, and the horizontal axis indicates the passage of time. In FIG. 8, electric power command value CHPW refers to the electric power command value provided from charging ECU 46 to add-on charger 42. Target value PR refers to the electric power computationally calculated for required charging, and is provided from the not-shown ECU. Monitor value PM refers to the charging power calculated from a product of a detected current and a detected voltage. Furthermore, correction value PC refers to the value for correcting target value PR and outputting electric power command value CHPW, and the relationship of (target value PR+correction value PC)=command value CHPW is established. Limit value PS refers to the output power of add-on charger 42 when add-on charger 42 limits an output thereof during the saving operation.

During times t0 to t1, electric power command value CHPW increases, while monitor value PM decreases. During times t0 to t1, correction value PC that is a difference between the target value and electric power command value CHPW gradually increases. On the other hand, monitor value PM gradually approaches limit value PS.

At time t1, when monitor value PM decreases to PS+DP that is the upper limit of region AS in FIG. 7, charging ECU 46 determines that charger 42 is being operated in the saving mode (YES in step S2). Then, as shown in step S3 in FIG. 6, the charging ECU 46 guard-processes correction value PC such that the amount of change in feedback correction value PC0 is less than or equal to 0. As a result, electric power command value CHPW never increases to an excessive value as shown by a broken line. The increase in electric power command value CHPW is limited as shown by a solid line. During times t2 to t3, charger 42 is operated in the saving mode, and therefore, monitor value PM substantially matches limit value PS.

At time t3, charger 42 returns from the saving mode to the normal mode in accordance with a decrease in temperature and the like, and monitor value PM starts to approach target value PR. At time t4, when monitor value PM becomes larger than (PS+DP), the operating point goes out of region AS in FIG. 7. Then, charging ECU 46 determines that the operation mode of charger 42 returns from the saving mode to the normal mode, and permits an increase in correction value PC. After time t4, a control is performed by using the normal PI control such that monitor value PM approaches target value PR.

By imposing the limitation in the saving mode such that electric power command value CHPW does not excessively deviate from target value PR as described above, the unstable behavior of the output current of charger 42 or the excessive electric power flowing through charger 42 when charger 42 returns from the saving mode to the normal mode can be prevented.

Second Embodiment

In the first embodiment, the continued increase in electric power command value CHPW while charger 42 is being operated in the saving mode is prevented by limiting the increase in the amount of correction made to the electric power command value at the time of feedback.

In the first embodiment, however, if target value PR is close to saving limit value PS, charging ECU 46 cannot recognize that charger 42 is being operated in the saving mode even if charger 42 is being operated in the saving mode. Therefore, in order to prevent the unstable behavior in such a case, correction value PC is further limited in a second embodiment by using another method.

In the second embodiment, another limitation is imposed on correction value PC, in addition to or instead of the control in the first embodiment.

Figure 9:
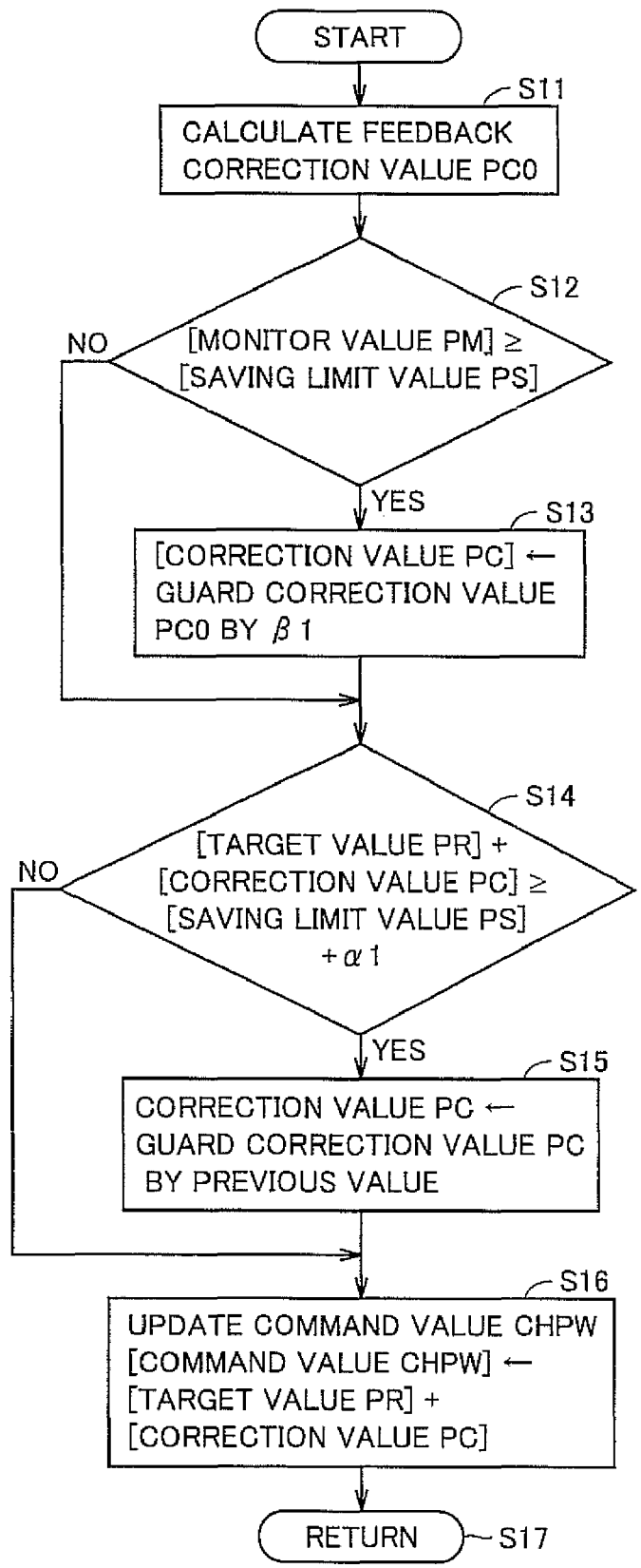
FIG. 9 is a flowchart for illustrating control in charging ECU 46 in FIG. 1 in a second embodiment.

FIG. 9 is a flowchart for illustrating control in charging ECU 46 in FIG. 1 in the second embodiment. The control shown in this flowchart is performed by the computer included in charging ECU 46. It is noted that the process in this flowchart is read for execution from a main routine at regular time intervals or whenever a prescribed condition is satisfied.

Referring to FIG. 9, first, feedback correction value PC0 is calculated in step S11. This corresponds to the process performed by feedback control unit 54 in FIG. 5.

Subsequently, in step S12, it is determined whether or not monitor value $PM \geqq$ saving limit value PS is satisfied.

If monitor value $PM \geqq$ saving limit value PS is not satisfied in step S12, the process proceeds to step S14 without applying the limitation in step S13. On the other hand, if monitor value $PM \geqq$ saving limit value PS is satisfied in step S12, the limitation of correction value PC in step S13 is applied.

In step S13, correction value PC before being limited PC0 is guarded by a guard value $\beta 1$ and is set as correction value PC. It is noted that, when the process directly proceeds from step S12 to step S14, feedback correction value PC0 is set as correction value PC as it is.

In step S14, it is determined whether or not target value PR+correction value PC saving limit value PS+$\alpha 1$ is satisfied. It is noted that $\alpha 1$ refers to a threshold value for determining whether or not electric power command value CHPW is significantly apart from saving limit value PS.

If target value PR+correction value $PC \geqq$ saving limit value PS+$\alpha 1$ is satisfied in step S14, the limitation of correction value PC in step S15 is applied. On the other hand, if the condition in step S14 is not satisfied, the process proceeds to step S16 without applying the limitation of correction value PC in step S15.

In step S15, correction value PC is guarded by the value of correction value PC set in the previous cycle, to prevent an increase in correction value PC. As a result, an unlimited increase in electric power command value CHPW is limited. Subsequently, in step S16, command value CHPW is updated. Through this update, electric power command value CHPW is calculated by adding correction value PC determined in the above to target value PR. When electric power command value CHPW is determined in step S16, the process proceeds to step S17 and the control is moved to the main routine.

Figure 10:
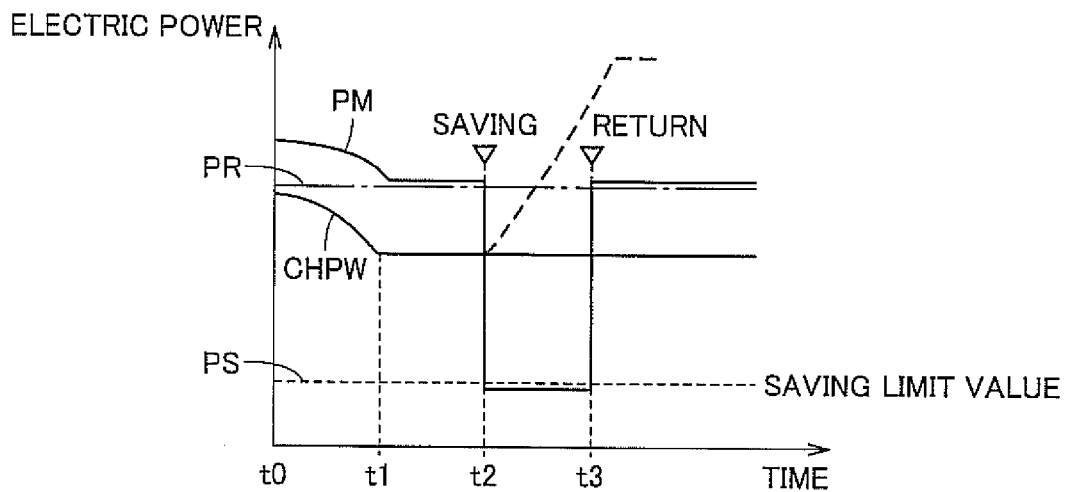
FIG. 10 is an operational waveform diagram when no limitation is imposed according to a process in the second embodiment.

FIG. 10 is an operational waveform diagram when no limitation is imposed according to the process in the second embodiment.

Figure 11:
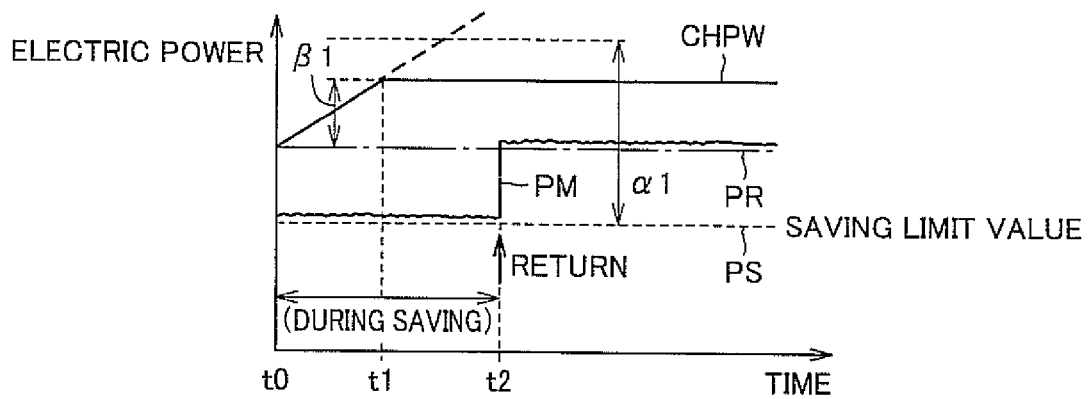
FIG. 11 is an operational waveform diagram when the electric power command value is limited according to the process in the second embodiment.

FIG. 11 is an operational waveform diagram when the electric power command value is limited according to the process in the second embodiment.

First, referring to FIG. 10, during times t0 to t1, electric power command value CHPW changes such that monitor value PM converges to target value PR.

During times t1 to t2, the stable operation is performed where monitor value PM matches target value PR. At time t2, charger 42 in FIG. 1 starts to be operated in the saving mode, so that monitor value PM approaches saving limit value PS. Then, the process described in the first embodiment is performed during times t2 to t3, and therefore, electric power command value CHPW never increases as shown by a broken line.

Even if charger 42 returns from the saving mode to the normal mode at time t3, the value of electric power command value CHPW having been output at time t2 is output, and the control in the normal mode starts from time t3.

On the other hand, if saving limit value PS is close to target value PR as shown in FIG. 11, electric power command value CHPW does not exceed threshold value PT in FIG. 7, and therefore, the limitation described in the first embodiment is not applied. Consequently, in FIG. 11, electric power command value CHPW increases although charger 42 is being operated in the saving mode during times t0 to t1. Thus, as shown in steps S12 and S13 in FIG. 9, electric power command value CHPW is limited so as not to increase by more than guard value β1 from target value PR.

As a result, during times t1 to t2, the increase in electric power command value CHPW is suppressed. When charger 42 returns from the saving mode to the normal mode at time t2, monitor value PM increases from saving limit value PS to around target value PR, and the charging system is operated with that state maintained.

Although FIG. 11 does not show the manner in which the limitation is imposed, electric power command value CHPW is similarly limited in steps S14 and S15 so as not to increase above the previous value, if it is likely that electric power command value CHPW increases by more than threshold value α1 from saving limit value PS.

According to the second embodiment, electric power command value CHPW does not increase without limitation even when target value PR is close to saving limit value PS, and therefore, the unstable behavior of charger 42 can be prevented.

Third Embodiment

In the first and second embodiments, the unstable behavior when charger 42 returns from the saving mode to the normal mode is prevented by limiting electric power command value CHPW output to charger 42 by charging ECU 46 in FIG. 1. In a third embodiment, the unstable operation when charger 42 returns from the saving mode to the normal mode is eliminated by limiting provided electric power command value CHPW on the charger 42 side and applying the limited electric power command value CHPW, instead of or in combination with the control in the first and second embodiments.

Figure 12:
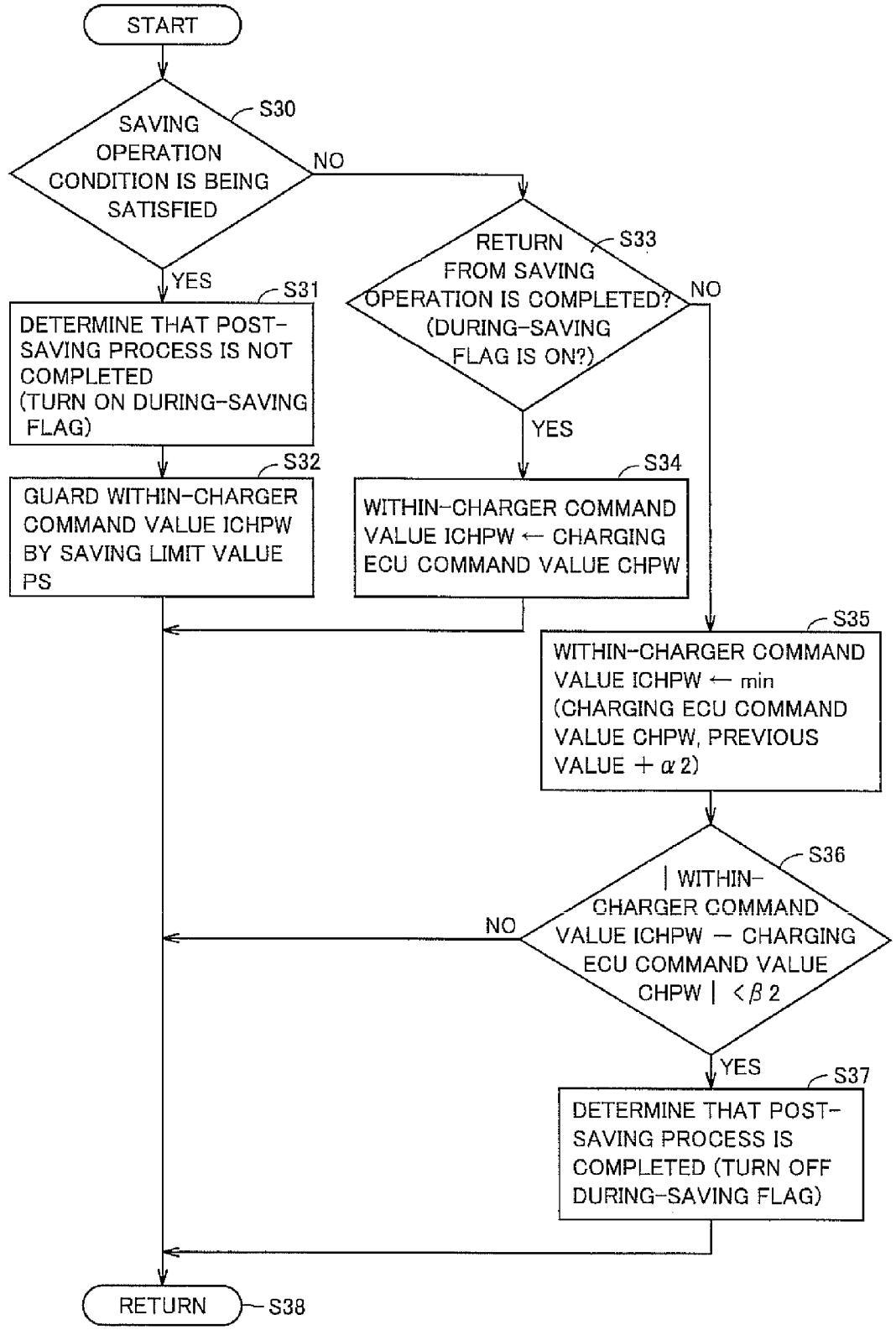
FIG. 12 is a flowchart for illustrating a processing of the electric power command value performed within microcomputer 88 in FIG. 3.

FIG. 12 is a flowchart for illustrating a processing of the electric power command value performed within microcomputer 88 in FIG. 3. It is noted that the process in this flowchart is read for execution from a main routine at regular time intervals or whenever a prescribed condition is satisfied.

Referring to FIG. 12, first, when the process starts, microcomputer 88 determines in step S30 whether or not the saving operation condition is being satisfied based on an output of temperature sensor 87. This determination is made, for example, based on threshold values T1, T2 and T3 as shown in FIG. 4.

If the saving operation condition is being satisfied in step S30, the during-saving flag stored in a storage area within microcomputer 88 is turned on in step S31, and it is determined that a post-saving process is not completed. The post-saving process here refers to a process performed until the state of charger 42 completely returns from the saving operation to the normal operation.

Then, the process proceeds from step S31 to step S32, where a within-charger command value ICHPW is guard-processed by saving limit value PS. As a result, electric power limiting unit 80 sends the electric power limited by saving limit value PS to the power storage device to be charged. Then, the process proceeds to step S38 and the control is moved to the main routine.

On the other hand, if it is determined in step S30 that the saving operation condition is not being satisfied, the process proceeds from step S30 to step S33. In step S33, it is determined whether or not the during-saving flag is in the on state. Thus, it is determined whether or not the return of charger 42 from the saving operation to the normal operation is completed (the post-saving process is completed).

If the during-saving flag is in the on state in step S33, the process proceeds to step S34. In step S34, electric power command value CHPW provided from charging ECU 46 is applied as it is within charger 42 as within-charger command value ICHPW, and electric power limiting unit 80 is controlled by microcomputer 88. Then, the process proceeds to step S38 and the control is moved to the main routine.

On the other hand, if the during-saving flag is not in the on state in step S33, the process proceeds to step S35. Here, although the saving operation condition is not satisfied, charger 42 does not yet return to the normal operation mode completely. In this case, in step S35, smaller one of electric power command value CHPW provided from charging ECU 46 and a value obtained by adding a prescribed increment α2 to previous within-charger command value ICHPW is set as within-charger command value ICHPW.

Then, the process proceeds to step S36, where it is determined whether or not an absolute value of a difference between within-charger command value ICHPW and electric power command value CHPW provided from charging ECU 46 becomes smaller than threshold value β2. If this difference is not yet smaller than threshold value β2, it is determined that the post-processing after the saving operation is not yet completed, and the process directly proceeds to step S38 and the control is moved to the main routine. On the other hand, if the absolute value of the difference between within-charger command value ICHPW and electric power command value CHPW becomes smaller than threshold value β2 in step S36, the process proceeds to step S37, where the during-saving flag is turned off. Thus, it is determined that the post-processing after the saving operation is completed. When the switching of the during-saving flag is completed in step S37, the process proceeds to step S38 and the control is moved to the main routine.

Figure 13:
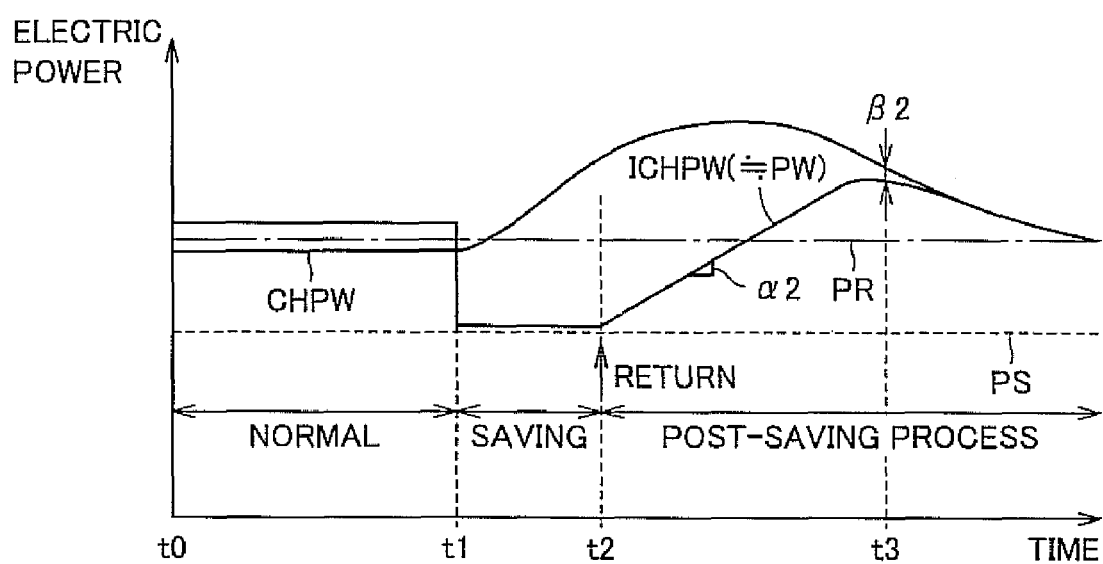
FIG. 13 is an operational waveform diagram for illustrating the operation when the process in the flowchart in FIG. 12 is performed.

FIG. 13 is an operational waveform diagram for illustrating the operation when the process in the flowchart in FIG. 12 is performed.

Referring to FIG. 13, during times t0 to t1, charger 42 is operated in the normal mode. In this case, electric power command value CHPW provided from charging ECU 46 and electric power command value ICHPW set within charger 42 are set to substantially the same value, that is, to around target value PR.

At time t1, when the saving operation condition is satisfied, electric power command value ICHPW within the charger is limited to limit value PS. During times t1 to t2, electric power command value ICHPW within charger 42 remains limited to limit value PS. On the other hand, whether or not the process is performed in combination with the control in the first embodiment, if target value PR is close to limit value PS, electric power command value CHPW increases during times t1 to t2.

If the control in FIG. 12 is not applied at time t2 when the saving operation condition of charger 42 is not satisfied such as due to a decrease in temperature of charger 42, electric power command value ICHPW within the charger is abruptly changed to electric power command value CHPW provided from charging ECU 46. With this, the charging power may become excessive or exhibit the unstable behavior.

Therefore, the limitation in step S35 in FIG. 12 is imposed during times t2 to t3, so that the increment per unit time is limited to $\alpha 2$ and an abrupt increase in the amount of charge can be prevented.

At time t3, when the difference between command value ICHPW within the charger and electric power command value CHPW provided from charging ECU 46 becomes smaller than threshold value $\beta 2$, the during-saving flag is turned off in step S37. Thereafter, through the process in step S34, within-charger command value ICHPW matches electric power command value CHPW sent from charging ECU 46.

Fourth Embodiment

In a fourth embodiment, it can be determined by charging ECU 46 whether a decrease in the charging power determined by charger 42 is caused by a shift of the operation mode of charger 42 to the saving mode or by a failure of charger 42.

Figure 14:
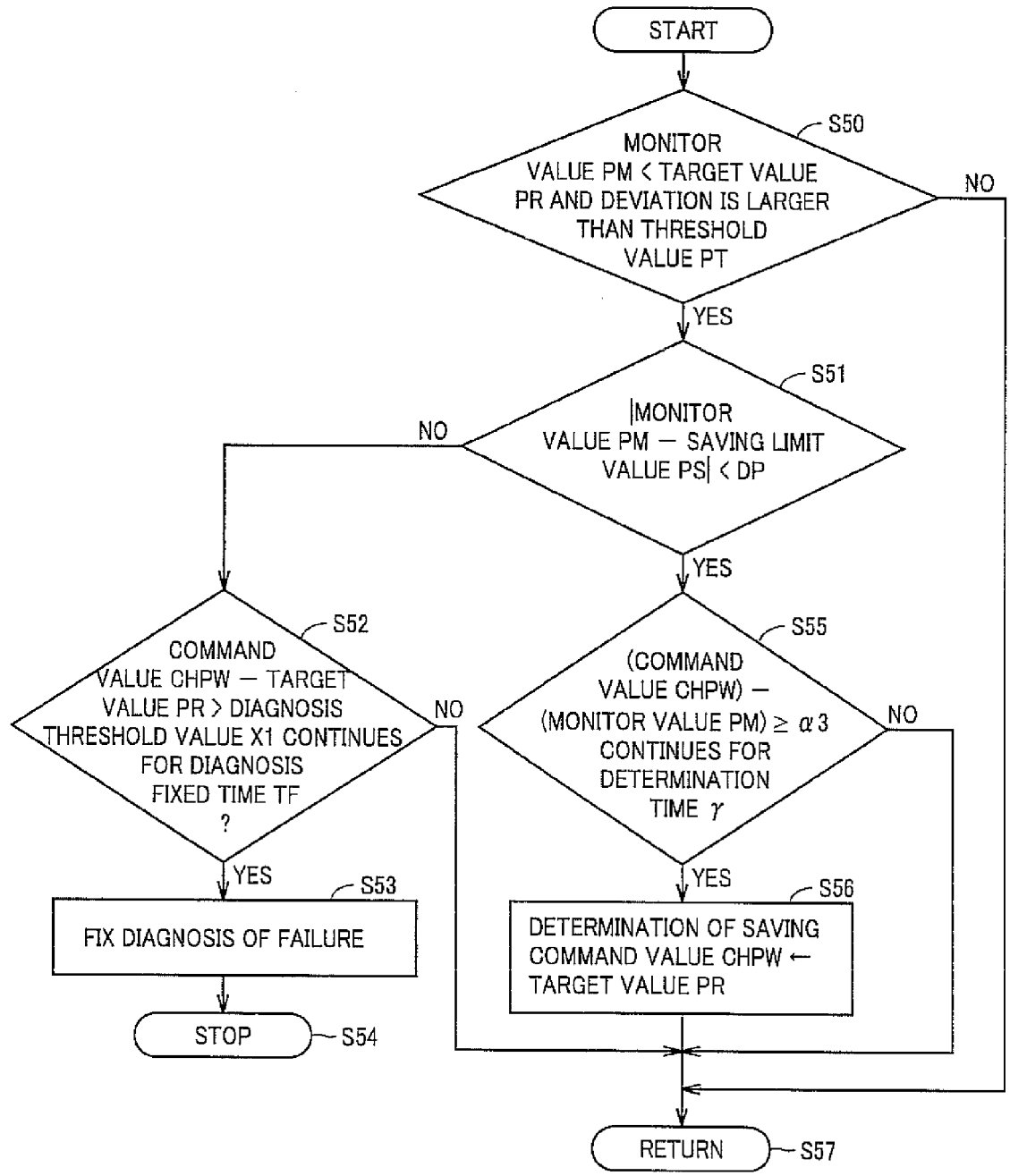
FIG. 14 is a flowchart for illustrating a process performed by charging ECU 46 in a fourth embodiment.

FIG. 14 is a flowchart for illustrating a process performed by charging ECU 46 in the fourth embodiment. The control shown in this flowchart is performed by the computer included in charging ECU 46. It is noted that the process in this flowchart is read for execution from a main routine at regular time intervals or whenever a prescribed condition is satisfied.

Referring to FIG. 14, first, when the process starts, charging ECU 46 determines in step S50 whether or not monitor value PM obtained by a product of output values of the current sensors and the voltage sensors is smaller than target value PR and the deviation is larger than threshold value PT. Subsequently, if the condition in step S50 is satisfied, the condition in step S51 is further determined. In step S51, it is determined whether or not an absolute value of a difference between monitor value PM and saving limit value PS is smaller than a threshold value DP.

Based on these determinations in steps S50 and S51, it is determined whether or not the operating point of charger 42 is within region AS in FIG. 7. If the condition in step S51 is not satisfied, the process proceeds to step S52, where it is determined whether or not a difference between electric power command value CHPW and target value PR is larger than a diagnosis threshold value X1, and it is determined whether or not that state continues for a diagnosis fixed time TF.

Figure 15:
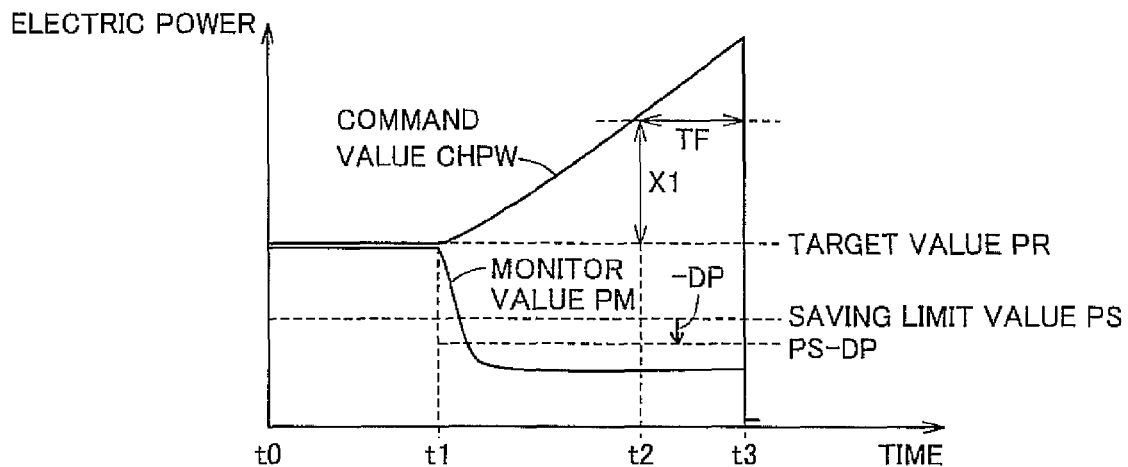
FIG. 15 is an operational waveform diagram for illustrating the operation when a condition determined in step S52 in FIG. 14 is satisfied.

FIG. 15 is an operational waveform diagram for illustrating the operation when the condition determined in step S52 in FIG. 14 is satisfied.

Referring to FIG. 15, during times t0 to t1, command value CHPW and monitor value PM are controlled to around target value PR, and charger 42 is operated normally.

At time t1, monitor value PM starts to decrease and command value CHPW starts to increase accordingly. During times t2 to t3, the state in which the difference between electric power command value CHPW and target value PR is larger than diagnosis threshold value X1 continues for diagnosis fixed time TF. During this time, monitor value PM is apart from saving limit value PS by determination range DP or more, and therefore, it is not determined that charger 42 is being operated in the saving mode. Thus, it is highly likely that charger 42 fails.

Referring again to FIG. 14, if the condition in step S52 is satisfied, the process proceeds to step S53, where a diagnosis that charger 42 fails is fixed. In step S54, charging stops.

On the other hand, if a condition of |monitor value PM−saving limit value PS|<DP is satisfied in step S51, the process proceeds to step S55. In step S55, it is determined whether or not the state in which the difference between electric power command value CHPW and monitor value PM is larger than or equal to a threshold value $\alpha 3$ continues for a determination time $\gamma$ or more. If the condition in step S55 is satisfied, the process proceeds to step S56. In step S56, it is determined that the operation mode of charger 42 is the saving mode, and electric power command value CHPW is set to target value PR in order to prevent electric power command value CHPW from continuing to increase and significantly moving away from target value PR. On the other hand, if the condition in step S55 is not satisfied, the process proceeds to step S57 without performing the process in step S56. In step S57, the control is moved to the main routine.

Figure 16:
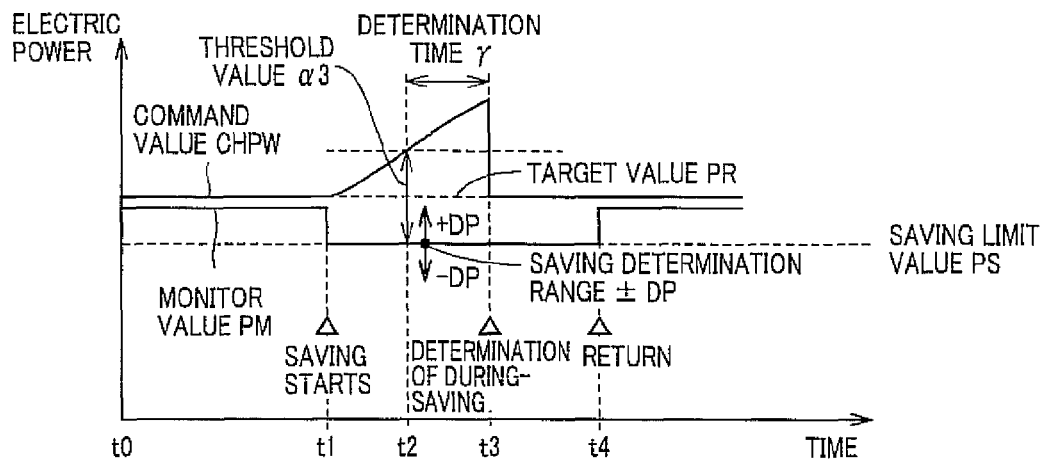
FIG. 16 is an operational waveform diagram for illustrating the manner in which the processes in steps S55 and S56 in FIG. 14 are performed.

FIG. 16 is an operational waveform diagram for illustrating the manner in which the processes in steps S55 and S56 in FIG. 14 are performed.

Referring to FIGS. 1 and 16, during times t0 to t1, charger 42 is operated in the normal mode, and command value CHPW is controlled to be close to monitor value PM.

At time t1, when the operation mode of charger 42 is shifted to the saving mode, monitor value PM is set to around saving limit value PS. The difference between monitor value PM and target value PR is widened, and charging ECU 46 causes electric power command value CHPW to increase accordingly.

As a result of the increase in electric power command value CHPW, the difference between electric power command value CHPW and monitor value PM exceeds threshold value $\alpha 3$ at time t2. At time t3, when this state continues for determination time $\gamma$, the process in step S56 is performed and electric power command value CHPW that has continued to increase is changed to target value PR. During times t3 to t4, the process in step S56 continues to be performed, and as a result, the state in which command value CHPW matches target value PR continues.

At time t4, in accordance with the decrease in temperature of charger 42 and the like, the operation mode of charger 42 is shifted from the saving mode to the normal mode, and monitor value PM is also controlled to be close to target value PR.

As described above, in the fourth embodiment, when a failure occurs, the failure can be detected separately from the saving mode.

Finally, the first to fourth embodiments are again summarized with reference to FIG. 1 and the like. A vehicle charging system for charging vehicle-mounted power storage devices 10-1 to 10-3 includes: a charger 42 configured to be supplied with electric power from a power supply external to a vehicle for charging the power storage devices, and operable in a normal mode such that output power matches a provided electric power command value CHPW, and limiting the output power to a limit value PS in a saving mode if electric power command value CHPW exceeds limit value PS; a charging power sensing unit (voltage sensors 14-1 to 14-3, current sensors 16-1 to 16-3 and the like) for sensing charging power supplied to the power storage devices; and a charging ECU 46 for generating electric power command value CHPW and outputting electric power command value CHPW to charger 42. Charging ECU 46 performs feedback-control for compensating for electric power command value CHPW based on a charging power monitor value PM sensed by the charging power sensing unit (voltage sensors 14-1 to 14-3, current sensors 16-1 to 16-3 and the like), such that charging power monitor value PM sensed by the charging power sensing unit (voltage sensors 14-1 to 14-3, current sensors 16-1 to 16-3 and the like) matches a target value PR, and in addition, limits an increase in electric power command value CHPW such that electric power command value CHPW does not significantly deviate from target value PR.

Preferably, as shown in FIG. 10, if charging ECU 46 detects that sensed charging power monitor value PM changes from around target value PR to around limit value PS within a prescribed time period (short time period before and after time t2), charging ECU 46 limits electric power command value CHPW to prevent electric power command value CHPW from increasing while sensed charging power monitor value PM remains at around limit value PS.

Preferably, as shown in FIG. 3, charger 42 includes a temperature sensor 87 for detecting whether or not a saving operation condition that designates the possibility of overheating of charger 42 is satisfied, a microcomputer 88 for determining switching of an operation mode between the saving mode and the normal mode, based on an output of temperature sensor 87, and an electric power limiting unit 80 for limiting the electric power from the power supply and supplying the electric power to the power storage devices as the charging power under control of microcomputer 88. Charging ECU 46 determines that the operation mode of charger 42 is shifted from the normal mode to the saving mode if charging ECU 46 detects that sensed charging power monitor value PM changes from around target value PR to around limit value PS within a prescribed time period, and recognizes that the operation mode returns from the saving mode to the normal mode when sensed charging power monitor value PM starts to increase from around limit value PS toward around target value PR afterward.

More preferably, as shown in FIGS. 12 and 13, in the saving mode, microcomputer 88 uses limit value PS as an internal electric power command value ICHPW to cause electric power limiting unit 80 to limit the charging power if electric power command value CHPW is larger than limit value PS, and at the time of return from the saving mode to the normal mode, microcomputer 88 limits a degree of an increase in internal electric power command value ICHPW to a degree shown by α2, when internal electric power command value ICHPW is matched with electric power command value CHPW.

Preferably, as shown in FIGS. 15 and 16, if charging ECU 46 detects that sensed charging power monitor value PM remains at around limit value PS and a state in which electric power command value CHPW is apart from sensed charging power monitor value PM by a first threshold value (α3) or more continues for a first time period (γ), charging ECU 46 determines that an operation mode of charger 42 is the saving mode. If charging ECU 46 detects that sensed charging power monitor value PM does not remain at around limit value PS and a state in which electric power command value CHPW is apart from target value PR by a second threshold value (X1) or more continues for a second time period (TF), charging ECU 46 determines that charger 42 fails.

More preferably, charging ECU 46 returns electric power command value CHPW to around target value PR if charging ECU 46 determines that the operation mode of charger 42 is the saving mode, and sets electric power command value CHPW to zero and stops charging if charging ECU 46 determines that charger 42 fails.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle charging system for charging a vehicle-mounted power storage device, comprising:

a charger configured to be supplied with electric power from a power supply external to a vehicle for charging said power storage device, and operable in a normal mode such that output power matches a provided electric power command value, and limiting the output power to a limit value in a saving mode if said electric power command value exceeds said limit value;

a charging power sensing unit for sensing charging power supplied to said power storage device; and a charging control device for generating said electric power command value and outputting said electric power command value to said charger, said charging control device performing feedback-control for compensating for said electric power command value based on the charging power sensed by said charging power sensing unit, such that the charging power sensed by said charging power sensing unit matches a target value, and in addition, limiting an increase in said electric power command value such that said electric power command value does not significantly deviate from said target value, said charger including a sensor for detecting whether or not a saving operation condition that designates the possibility of overheating of said charger is satisfied, a control unit for determining switching of an operation mode between said saving mode and said normal mode, based on an output of said sensor, and an electric power limiting unit for limiting the electric power from said power supply and supplying the electric power to said power storage device as said charging power under control of said control unit, wherein said charging control device determines that the operation mode of said charger is shifted from said normal mode to said saving mode if said charging control device detects that the charging power sensed by said charging power sensing unit changes from around said target value to around said limit value within a prescribed time period, and recognizes that said operation mode returns from said saving mode to said normal mode when the charging power sensed by said charging power sensing unit starts to increase from around said limit value toward around said target value afterward, and in said saving mode, said control unit uses said limit value as an internal electric power command value to cause said electric power limiting unit to limit the charging power if said electric power command value is larger than said limit value, and at the time of return from said saving mode to said normal mode, said control unit limits a degree of an increase in said internal electric power command value when said internal electric power command value is matched with said electric power command value.

2. The vehicle charging system according to claim 1, wherein
if said charging control device detects that the charging power sensed by said charging power sensing unit changes from around said target value to around said limit value within a prescribed time period, said charging control device limits said electric power command value to prevent said electric power command value from increasing while the charging power sensed by said charging power sensing unit remains at around said limit value.

3. The vehicle charging system according to claim 2, wherein
if said charging control device detects that the charging power sensed by said charging power sensing unit remains at around said limit value and a state in which said electric power command value is apart from the charging power sensed by said charging power sensing unit by a first threshold value or more continues for a first time period, said charging control device determines that an operation mode of said charger is said saving mode, and
if said charging control device detects that the charging power sensed by said charging power sensing unit does not remain at around said limit value and a state in which said electric power command value is apart from said target value by a second threshold value or more continues for a second time period, said charging control device determines that said charger fails.

4. The vehicle charging system according to claim 3, wherein
said charging control device returns said electric power command value to around said target value if said charging control device determines that the operation mode of said charger is said saving mode, and sets said electric power command value to zero and stops charging if said charging control device determines that said charger fails.

5. The vehicle charging system according to claim 1, wherein
if said charging control device detects that the charging power sensed by said charging power sensing unit remains at around said limit value and a state in which said electric power command value is apart from the charging power sensed by said charging power sensing unit by a first threshold value or more continues for a first time period, said charging control device determines that an operation mode of said charger is said saving mode, and
if said charging control device detects that the charging power sensed by said charging power sensing unit does not remain at around said limit value and a state in which said electric power command value is apart from said target value by a second threshold value or more continues for a second time period, said charging control device determines that said charger fails.

6. The vehicle charging system according to claim 5, wherein
said charging control device returns said electric power command value to around said target value if said charging control device determines that the operation mode of said charger is said saving mode, and sets said electric power command value to zero and stops charging if said charging control device determines that said charger fails.

* * * * *

UNITED STATES PATENT AND TRADEMARK OFFICE
CERTIFICATE OF CORRECTION

PATENT NO.         : 8,058,848 B2                                Page 1 of 1
APPLICATION NO.    : 12/577763
DATED              : November 15, 2011
INVENTOR(S)        : Noritake Mitsutani It is certified that error appears in the above-identified patent and that said Letters Patent is hereby corrected as shown below:

At column 12, line number 38, delete "$\geqq$" insert --$\geq$--.

At column 12, line number 39, delete "$\geqq$" insert --$\geq$--.

At column 12, line number 42, delete "$\geqq$" insert --$\geq$--.

At column 12, line number 50, After PC insert --$\geq$--.

At column 12, line number 54, delete "$\geqq$" insert --$\geq$--.

Signed and Sealed this
Thirty-first Day of July, 2012

David J. Kappos
*Director of the United States Patent and Trademark Office*